United States Patent
Nakai et al.

(10) Patent No.: US 11,099,805 B2
(45) Date of Patent: Aug. 24, 2021

(54) REPRODUCED DATA OUTPUT APPARATUS AND COMPUTER PROGRAM PRODUCT

(71) Applicants: DENSO CORPORATION, Kariya (JP); TOYOTA JIDOSHA KABUSHIKI KAISHA, Toyota (JP); PIONEER CORPORATION, Tokyo (JP); DENSO TEN LIMITED, Kobe (JP)

(72) Inventors: Eiji Nakai, Kariya (JP); Kazushige Hayashi, Toyota (JP); Jun Yuyama, Toyota (JP); Yoshinobu Orui, Tokyo (JP); Go Takahashi, Kobe (JP); Hirotaka Nakahara, Kobe (JP); Kenji Yoshida, Kobe (JP)

(73) Assignees: DENSO CORPORATION, Kariya (JP); TOYOTA JIDOSHA KABUSHIKI KAISHA, Toyota (JP); PIONEER CORPORATION, Tokyo (JP); DENSO TEN LIMITED, Kobe (JP)

( * ) Notice: Subject to any disclaimer, the term of this patent is extended or adjusted under 35 U.S.C. 154(b) by 610 days.

(21) Appl. No.: 16/071,144

(22) PCT Filed: Jan. 18, 2017

(86) PCT No.: PCT/JP2017/001555
§ 371 (c)(1),
(2) Date: Jul. 19, 2018

(87) PCT Pub. No.: WO2017/126553
PCT Pub. Date: Jul. 27, 2017

(65) Prior Publication Data
US 2021/0173612 A1 Jun. 10, 2021

(30) Foreign Application Priority Data
Jan. 21, 2016 (JP) .............................. JP2016-009731

(51) Int. Cl.
*G06F 3/16* (2006.01)
*H04M 1/72409* (2021.01)
(Continued)

(52) U.S. Cl.
CPC .............. *G06F 3/165* (2013.01); *B60K 37/02* (2013.01); *H04M 1/72409* (2021.01); *H04M 1/72442* (2021.01); *B60K 2370/16* (2019.05)

(58) Field of Classification Search
CPC combination set(s) only.
See application file for complete search history.

(56) References Cited

U.S. PATENT DOCUMENTS 9,300,416 B2 * 3/2016 Lewis .............. G11B 20/00992
2006/0082652 A1 4/2006 Sugiyama
(Continued)

FOREIGN PATENT DOCUMENTS

JP 2006113766 A 4/2006
JP 2008092210 A 4/2008

*Primary Examiner* — Phung-Hoang J Nguyen
(74) *Attorney, Agent, or Firm* — Harness, Dickey & Pierce, P.L.C.

(57) ABSTRACT

A reproduced data output apparatus includes: a reproduced data receiver section to receive a reproduced data of a content from an external instrument having a reproduction function of the content; a report determiner section to determine whether an operation status report signal indicating that a status of a present operation of the external instrument is a status of a different operation is reported from the external instrument, in response to that an occurrence of an event is identified during a status of a first operation being identified as a status of a present operation of the external instrument; and a command transmission controller section to transmit a command that requires a re-start of the first operation to the external instrument, in (Continued)

response to that the operation status report signal is determined to be reported from the external instrument.

10 Claims, 3 Drawing Sheets

(51) Int. Cl.
*B60K 37/02* (2006.01)
*H04M 1/72442* (2021.01)

(56) References Cited

U.S. PATENT DOCUMENTS

| | | | | |
|---|---|---|---|---|
| 2007/0082706 | A1* | 4/2007 | Campbell | G10L 15/26 |
| | | | | 455/563 |
| 2007/0233725 | A1* | 10/2007 | Michmerhuizen | G10L 13/08 |
| 2015/0181011 | A1* | 6/2015 | Sugahara | H04M 1/6083 |
| | | | | 455/569.2 |
| 2017/0353693 | A1* | 12/2017 | Semsey | H04M 1/6091 |

* cited by examiner

REPRODUCED DATA OUTPUT APPARATUS AND COMPUTER PROGRAM PRODUCT

CROSS REFERENCE TO RELATED APPLICATIONS

This application is a U.S. National Phase application under 35 U.S.C. 371 of International Application No. PCT/JP2017/001555 filed on Jan. 18, 2017 and published in Japanese as WO 2017/126553 A1 on Jul. 27, 2017. This application is based on and claims the benefit of priority from Japanese Patent Application No. 2016-009731 filed on Jan. 21, 2016. The entire disclosures of all of the above applications are incorporated herein by reference.

TECHNICAL FIELD

The present disclosure relates to a reproduced data output apparatus and a computer program product.

BACKGROUND ART

For example, there is provided a reproduced data output apparatus that is connected with an external instrument having a reproduction function for contents such as music contents. The external instrument reproduces a content to generate a reproduced data of the content. Upon receiving the reproduced data of the content from the external instrument, the reproduced data output apparatus outputs the received reproduced data. In a system enabling a reproduced data output apparatus to be connected with an external instrument, a user is required to perform a predetermined manipulation onto the reproduced data output apparatus, for controlling an operation of the external instrument such as reproducing a content, or interrupting the reproduction. Incidentally, a factor in the external instrument may cause the operation of the external instrument to fall into a state which the user does not intend. For example, under the state where the external instrument is reproducing a content, the reproduction of the content may be interrupted although the user does not perform any manipulation for interrupting the reproduction onto the reproduced data output apparatus. In contrast, a configuration of an external instrument controlling an operation, such as controlling an operation depending on a state of the external instrument itself, is described in Patent literature 1, for instance.

PRIOR ART LITERATURES

Patent Literature

Patent literature 1: JP 2008-92210 A

SUMMARY OF INVENTION

In a system enabling a reproduced data output apparatus to be connected with an external instrument, the reproduced data output apparatus operates as a master instrument whereas the external instruments operates as a slave instrument. The system provides a configuration where the reproduced data output apparatus controls an operation of the external instrument. Such a system enabling a reproduced data output apparatus to be connected with an external instrument thus poses a difficulty to the external instrument as a slave instrument in respect of controlling own operation independently.

It is an object of the present disclosure to provide a reproduced data output apparatus and a computer program product, which are enabled to control appropriately an operation of an external instrument having a reproduction function of a content under a configuration enabling the reproduced data output apparatus to be connected with the external instrument.

According to an example of the present disclosure, a reproduced data receiver section receives a reproduced data of a content from an external instrument having a reproduction function of the content. An operation status identifier section identifies a status of a present operation of the external instrument. An event occurrence identifier section identifies an occurrence of an event. A report determiner section determines whether an operation status report signal indicating that a status of a present operation of the external instrument is a status of a different operation is reported from the external instrument, in response to that the event occurrence identifier section identifies an occurrence of an event during a status of a first operation being identified by the operation status identifier section as a status of a present operation of the external instrument. A command transmission controller section transmits a command that requires a re-start of the first operation to the external instrument, in response to that the report determiner section determines that the operation status report signal is reported from the external instrument.

That is, suppose a case that an event occurs during a status of a first operation being identified as a status of a present operation of the external instrument and an operation status report signal which indicates that a status of a present operation of the external instrument is a status of a different operation is reported from the external instrument. In such a case, a command which requires a re-start of the first operation is transmitted to the external instrument. The external instrument thereby resumes the first operation. The status of the operation of the external instrument can be returned to the status before the occurrence of the event, allowing the operation of the external instrument to be appropriately controllable. Moreover, the user needs not perform any manipulation that causing the external instrument to resume the first operation, thereby enhancing the usability. In particular, in the use in a vehicle, a manipulation by a user is not needed, enhancing the safety.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
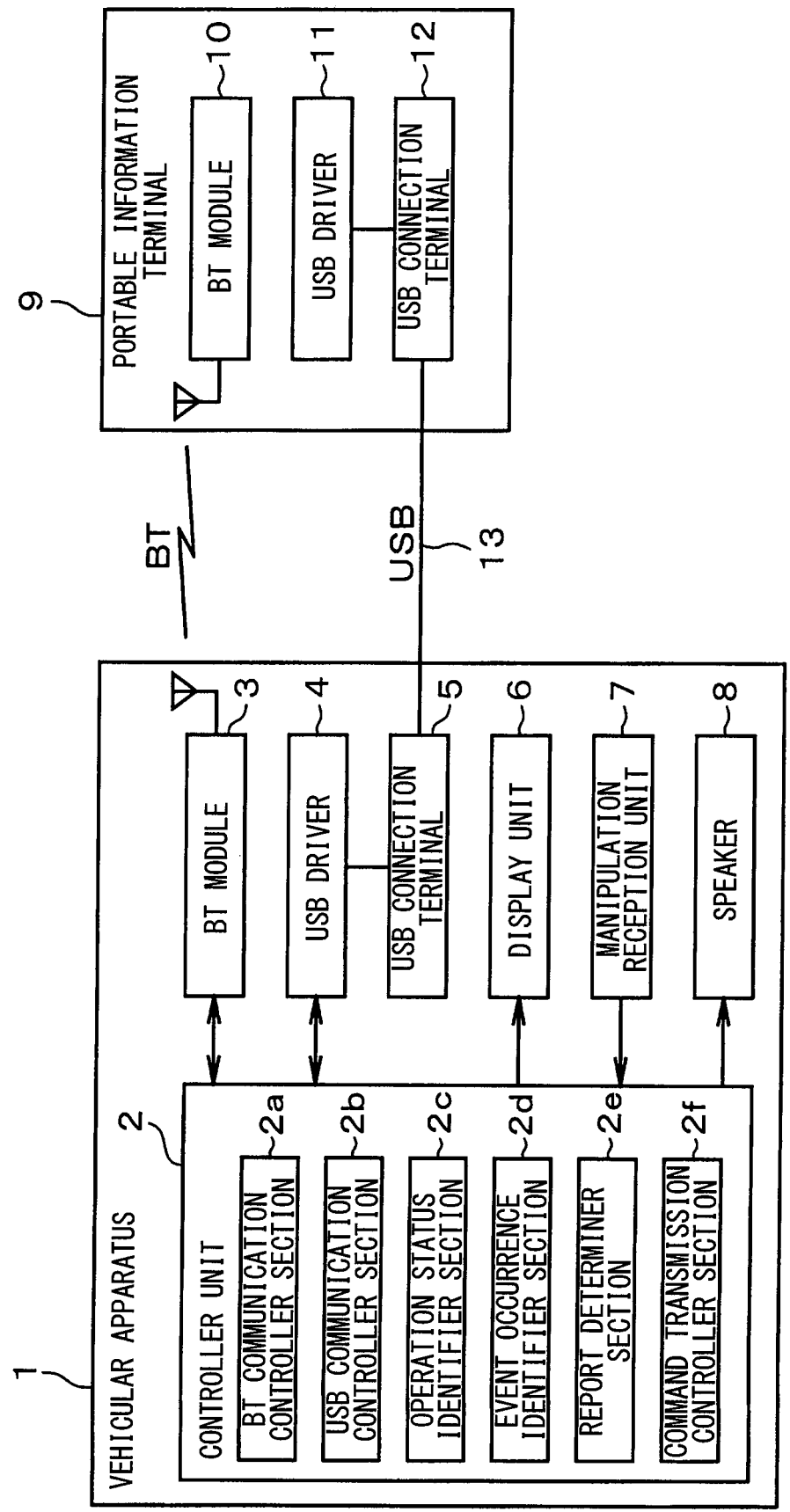
FIG. 1 is a functional block diagram illustrating an embodiment.

The following explains an embodiment where the present disclosure is applied to a vehicular apparatus that is mounted in a vehicle, with reference to the drawings. The vehicular apparatus 1 includes a controller unit 2; a Bluetooth (registered trademark, hereinafter referred to as BT) module 3 (equivalent to a reproduced data receiver section, a vehicular reproduced data receiver section), a USB (Universal Serial Bus) driver 4, a USB connection terminal 5, a display unit 6, a manipulation reception unit 7, and a speaker 8.

The controller unit 2 is configured by a microcomputer having a CPU (Central Processing Unit), a ROM (Read-Only Memory), a RAM (Random Access Memory), and an I/O (Input/Output). The controller unit 2 executes a computer program stored in a non-transitory tangible storage medium, thereby executing a process corresponding to the computer program to perform an overall control of the vehicular apparatus 1.

The BT module 3 performs a data communication, according to the communication protocol specified by BT, with the BT module 10 of the portable information terminal 9 (equivalent to an external instrument). The USB driver 4 performs a data communication, according to the communications protocol specified by USB, with the USB driver 11 of the portable information terminal 9, under the state where the USB connection terminal 5 and the USB connection terminal 12 are connected with a USB cable 13 (equivalent to a cable). Note that the portable information terminal 9 is a multifunctional mobile phone, which is a so-called smart phone, for instance. The display unit 6, which may be configured with a liquid crystal display, displays a screen view indicated by a display instruction signal upon receiving the display instruction signal from the controller unit 2. The manipulation reception unit 7 is configured with a touch panel or mechanical switches, which are formed on a screen view of the display unit 6. The manipulation reception unit 7 detects a user's manipulation to thereby output a corresponding manipulation detection signal to the controller unit 2.

The portable information terminal 9, which is enabled to store a music content, includes a reproduction function (i.e., a function of an audio player) of a stored music content and reproduces the music content to thereby generate a music data. Suppose a case where a BT communication is established between the BT module 3 and the BT module 10 so as to connect (i) A2DP (Advanced Audio Distribution Profile) which specifies transfer of a music data, and (ii) AVRCP (Audio/Video Remote Control Profile) which specifies transfer of a command (i.e., a control data about operation). In such a case, the portable information terminal 9 transmits a music data to the vehicular apparatus 1 using the A2DP via the BT module 10.

In the vehicular apparatus 1, upon receiving a music data from the portable information terminal 9 via the BT module 3, the controller unit 2 outputs the received music data via the speaker 8. Moreover, the controller unit 2 displays a music reproduction screen view about reproduction of a music content on the display unit 6, to thereby receive a manipulation about reproduction of the music content from a user. In detail, the controller unit 2 displays various buttons manipulated by a user such as a reproducing button, a fast forwarding button, a rewinding button, a pausing button, and a stopping button, on the music reproduction screen view, thereby to receive various manipulations from the user, such as reproducing, fast forward, rewinding, pausing, and stopping, via the manipulation reception unit 7. Upon receiving a manipulation from the user via the manipulation reception unit 7, the controller unit 2 transmits a corresponding command to the portable information terminal 9 using AVRCP via the BT module 3. Upon receiving the command from the vehicular apparatus 1 via the BT module 10, the portable information terminal 9 performs reproducing of the music content, fast forward, rewinding, pausing, or stopping, according to the received command. The portable information terminal 9 then transmits a play status (which is equivalent to an operation status report signal) which indicates a status of a present operation to the vehicular apparatus 1 via the BT module 10.

Under the above configuration, when the USB cable 13 is inserted into both of the USB connection terminal 5 and the USB connection terminal 12, the electric power is supplied to the portable information terminal 9 from the vehicular apparatus 1, allowing charging of the portable information terminal 9. That is, the user can start charging of the portable information terminal 9 by inserting the USB cable 13 into both the USB connection terminal 5 and the USB connection terminal 12; the user can finish charging of the portable information terminal 9 by removing the USB cable 13 from each of the USB connection terminal 5 and the USB connection terminal 12. When the USB cable 13 is inserted into both the USB connection terminal 5 and the USB connection terminal 12, the USB driver 4 outputs an insertion detection signal which indicates that the USB cable 13 is inserted, to the controller unit 2. In contrast, when the USB cable 13 is removed from any one of the USB connection terminal 5 and the USB connection terminal 12, the USB driver 4 outputs a removal detection signal which indicates that the USB cable 13 is removed, to the controller unit 2.

The controller unit 2 includes a BT communication controller section 2a, a USB communication controller section 2b, an operation status identifier section 2c (equivalent to a reproduction status identifier section), an event occurrence identifier section 2d, a report determiner section 2e, and a command transmission controller section 2f. Each of the sections 2a to 2f is configured by a computer program executed by the controller unit 2 and is achieved with software. The BT communication controller section 2a controls BT communication by controlling an operation of the BT module 3. The USB communication controller section 2b controls USB communication by controlling an operation of the USB driver 4.

The operation status identifier section 2c identifies a status of a present operation of the portable information terminal 9. The event occurrence identifier section 2d receives the insertion detection signal or the removal detection signal from the USB driver 4, detects the insertion or removal of the USB cable 13, and identifies an occurrence of an event. When an occurrence of an event is identified during a status of a first operation being identified as a status of a present operation of the portable information terminal 9, the report determiner section 2e determines whether a play status which indicates that the status of the present operation of the portable information terminal 9 is a status of a different operation is received from the portable information terminal 9 (i.e., whether an operation status report signal is received). When the play status which indicates that the status of the present operation of the portable information terminal 9 is a status of a different operation is received from the portable information terminal 9, the command transmission controller section 2f transmits a command which requires a re-start of the first operation to the portable information terminal 9.

Under a configuration where the vehicular apparatus 1 is enabled to be connected with the portable information terminal 9, the user performs various manipulations such as reproducing, fast forwarding, rewinding, pausing, or stopping, in the vehicular apparatus 1 and a command assigning such a manipulation is transmitted from the vehicular apparatus 1 to the portable information terminal 9, which controls an operation of the portable information terminal 9. When the USB cable 13 is inserted or removed, the portable information terminal 9 may transition into an operation which the user does not intend, regardless of whether the user does not perform any manipulation in the vehicular apparatus 1. The controller unit 2 performs the following processing against such an issue.

Figure 2:
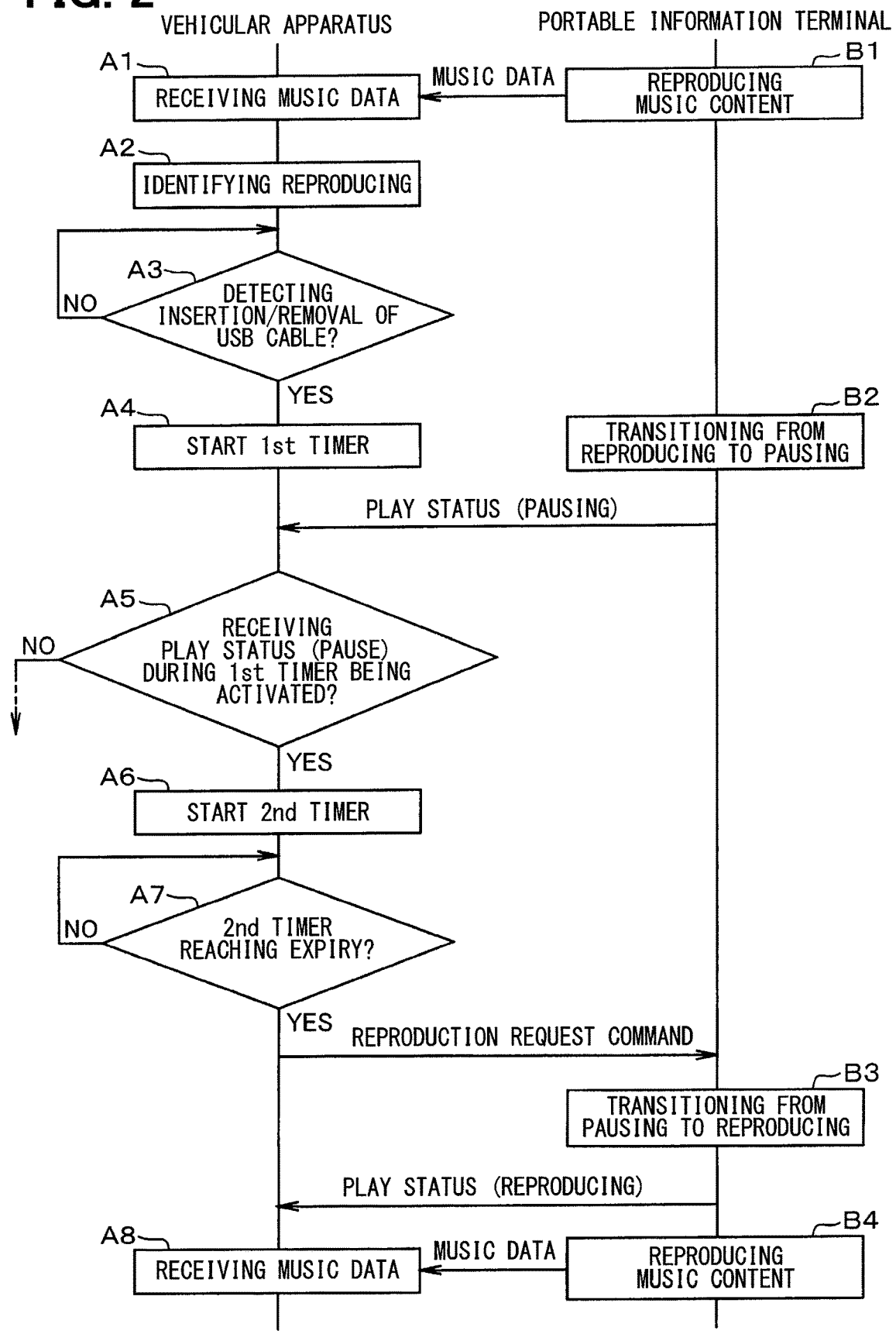
FIG. 2 is a sequence diagram (part 1)
Figure 3:
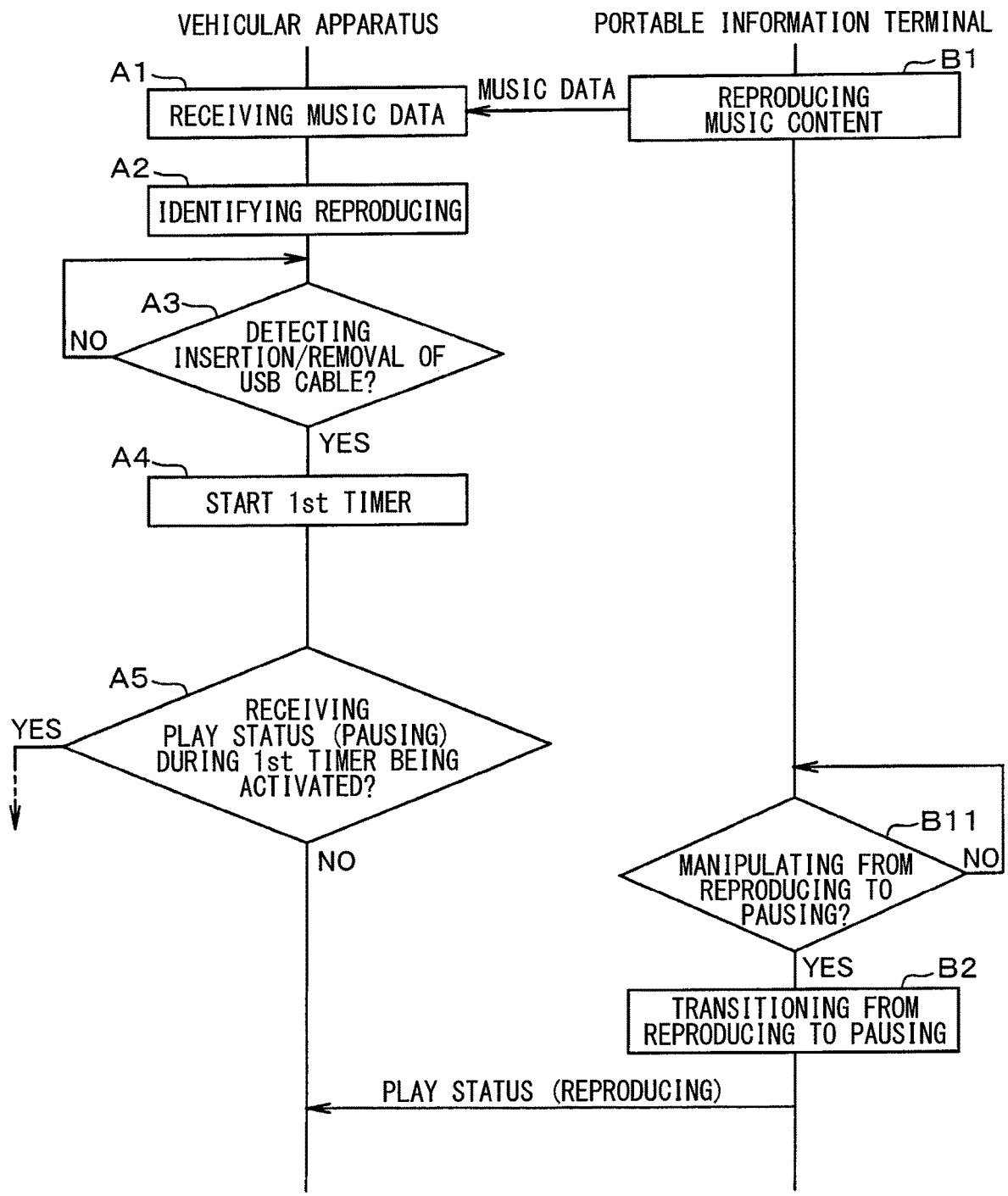
FIG. 3 is a sequence diagram (part 2).

The following explains an operation of the above configuration with reference to FIGS. 2, and 3. In the vehicular apparatus 1, the controller unit 2 operates as follows. When the portable information terminal 9 is reproducing a music content (B1) and the music data from the portable information terminal 9 is being received via the BT module 3 (A1), the status of the present operation of the portable information terminal 9 is reproducing of a music content (A2, which is equivalent to a first procedure). The controller unit 2 monitors an insertion or a removal of the USB cable 13 while the status of the present operation of the portable information terminal 9 is identified as reproducing the music content (A3).

Now, the user inserts the USB cable 13 into both the USB connection terminal 5 and the USB connection terminal 12 for starting charging of the portable information terminal 9. In this case, an insertion detection signal is outputted to the controller unit 2 via the USB driver 4. In contrast, the user removes the USB cable 13 from either the USB connection terminal 5 or the USB connection terminal 12 for finishing charging of the portable information terminal 9. In this case, a removal detection signal is outputted to the controller unit 2 via the USB driver 4. The controller unit 2 receives the insertion detection signal or the removal detection signal via the USB driver 4, detects the insertion or removal of the USB cable 13 (A3: YES, a second step), and identifies an occurrence of an event, starting to activate a first timer (A4). The first timer is a timer which measures three seconds (which is equivalent to a predetermined first period of time).

Now, as mentioned above, even if the user does not perform any manipulation in the vehicular apparatus 1, an insertion or a removal of the USB cable 13 may cause the portable information terminal 9 to transition to an operation which the user does not intend. Assume a case that an operation of the portable information terminal 9 transitions from reproducing to pausing. That is, as indicated in FIG. 2, the portable information terminal 9 transitions from reproducing to pausing (B2). In this case, a play status which indicates that the status of the present operation is pausing is transmitted to the vehicular apparatus 1 via the BT module 10.

In the vehicular apparatus 1, when determining that the play status which indicates that the status of the present operation of the portable information terminal 9 is pausing is received from the portable information terminal 9 via the BT module 3 during the first timer being activated (A5: YES), the controller unit 2 starts to activate a second timer (A6). The second timer is a timer which measures three seconds (equivalent to a predetermined second period of time). When determining that the second timer reaches an expiry (A7: YES), the controller unit 2 transmits a reproduction request command to the portable information terminal 9 via the BT module 3. Upon receiving the reproduction request command from the vehicular apparatus 1 via the BT module 10, the portable information terminal 9 transitions from pausing to reproducing (i.e., cancels pausing and resumes reproducing B3), and transmits a play status which indicates that the status of the present operation is reproducing of a music content to the vehicular apparatus 1 via the BT module 10. The portable information terminal 9 then comes to be under reproducing of the music content (B4); in the vehicular apparatus 1, the controller unit 2 comes to be under receiving of the music data from the portable information terminal 9 via the BT module 3 (A8).

The above explains a case where the operation of the portable information terminal 9 transitions from reproducing to pausing due to an insertion or a removal of the USB cable 13. In contrast, suppose a case where the operation of the portable information terminal 9 continues the reproducing even when an insertion or a removal of the USB cable 13 occurs. In such a case, as illustrated in FIG. 3, the portable information terminal 9 does not transmit any play status which indicates that the status of the present operation is pausing to the vehicular apparatus 1 via the BT module 10. In this case, the controller unit 2 determines that the play status which indicates that the status of the present operation of the portable information terminal 9 is pausing is not received from the portable information terminal 9 via the BT module 3 during the first timer being activated (A5: NO); thereby, the controller unit 2 does not perform neither (i) starting to activate the second time, nor (ii) transmitting any reproduction request command to the portable information terminal 9 via the BT module 3. Moreover, when a user performs a manipulation for pausing to the portable information terminal 9 (B11: YES), the portable information terminal 9 transitions from reproducing of the music content to pausing (B2) while transmitting a play status which indicates that the status of the present operation is pausing to the vehicular apparatus 1 via the BT module 10.

The above assumes a case where the operation of the portable information terminal 9 transitions from reproducing to pausing due to an insertion or a removal of the USB cable 13. Even another case where the operation of the portable information terminal 9 transitions from reproducing to other than pausing may be similarly provided. For example, a case where the operation of the portable information terminal 9 transitions from reproducing to rewinding or fast forwarding may be similarly provided. Further, a case where the operation of the portable information terminal 9 transitions from other than reproducing may be similarly provided. For example, a case where the operation of the portable information terminal 9 transitions from rewinding or fast forwarding to reproducing or pausing due to an insertion or a removal may be similarly provided. That is, any case where the operation of the portable information terminal 9 transitions to any status due to an insertion or a removal of the USB cable 13 may be similarly provided.

As explained above, the present embodiment may provide the following advantageous effects. In the vehicular apparatus 1, an insertion or a removal of the USB cable 13 is detected while the status of the present operation of the portable information terminal 9 is reproducing of a music content. A play status which indicates that the status of the present operation of the portable information terminal 9 is pausing is then received from the portable information terminal 9. A reproduction request command is then transmitted to the portable information terminal 9. This configuration allows the portable information terminal 9 to re-start reproducing of a music content and to return to the status of the operation before an insertion or a removal of the USB cable 13 is detected, allowing the operation of the portable information terminal 9 to be appropriately controllable. Moreover, the user need not perform a manipulation that causes the portable information terminal 9 to resume reproducing of the music content, enhancing the usability. In particular, in the use in a vehicle, a manipulation by a user is unneeded, enhancing the safety.

Moreover, in the vehicular apparatus 1, it is determined whether a play status which indicates that the status of the present operation of the portable information terminal 9 is pausing is received within a period of time from when an insertion or a removal of the USB cable 13 is detected to when the first timer reaches expiry. Under this configuration, although the user may manipulate the portable information terminal 9, it is determined whether the play status is reported only within a period of time in which the user is assumed not to manipulate the portable information terminal 9. This can prevent a mis-determination.

Moreover, in the vehicular apparatus 1, the second timer is started to be activated after a play status which indicates that the status of the present operation of the portable information terminal 9 is pausing is received from the portable information terminal 9; then, when the second timer reaches expiry, a reproduction request command is transmitted to the portable information terminal 9. Such a configuration can avoid a situation where the reproduction request command is transmitted undesirably to the portable information terminal 9 while the operation of the portable information terminal 9 is under an unstable state. That is, the operation of the portable information terminal 9 may fall into an unstable state immediately after reporting the play status which indicates that the status of the present operation is pausing. The reproduction request command is transmitted to the portable information terminal 9 at a point of time when such an unstable state is solved, allowing the operation of the portable information terminal 9 to be appropriately controllable.

The present disclosure is described based on the embodiment, it is understood that the present disclosure does not need to be limited to the embodiment or its configuration. The present disclosure is intended to cover various modification examples and equivalent arrangements. In addition, the various combinations and configurations, and other combinations and configurations, including more, less or only a single element, are also within the spirit and scope of the present disclosure.

The present disclosure may be applied not only to the use in a vehicle but also to the use in other than in a vehicle. The present embodiment explains an example case where the operation of the portable information terminal 9 transitions due to an insertion or a removal of the USB cable 13. However, it is not needed to be limited thereto. Another event may be assumed to occur as a factor that causes the operation of the portable information terminal 9 to transition; the present disclosure may also applied to a case where the operation of the portable information terminal 9 transitions due to another factor.

The present embodiment explains an example configuration which transfers a music data via a BT communication. However, there is no need to be limited thereto. The music data may be transferred via data communications using other wireless communications, such as BLE (Bluetooth Low Energy) or WiFi (Wireless Fidelity) (registered trademark). Moreover, the reproduced data may be transferred via the data communication using a wired communication. That is, another configuration may be provided which uses a plurality of wired communications; an insertion or a removal of a cable of a first wired communication may be detected while a music data is transferred via a cable of a second wired communication.

The present embodiment explains an example configuration where an external instrument has a reproduction function of a music content and a music data is transferred to a vehicular apparatus. However, there is no need to be limited thereto. Another configuration may be provided where an external instrument has a reproduction function of an image content and an image data is transferred to a vehicular apparatus.

What is claimed is:

1. A reproduced data output apparatus comprising:
a reproduced data receiver section configured to receive a reproduced data of a content from an external instrument having a reproduction function of the content;
an operation status identifier section configured to identify a status of a present operation of the external instrument;
an event occurrence identifier section configured to identify an occurrence of an event;
a report determiner section configured to determine whether an operation status report signal indicating that a status of a present operation of the external instrument is a status of a different operation is reported from the external instrument, in response to that the event occurrence identifier section identifies an occurrence of an event during a status of a first operation being identified by the operation status identifier section as the status of the present operation of the external instrument; and
a command transmission controller section configured to transmit a command that requires a re-start of the first operation to the external instrument, in response to that the report determiner section determines that the operation status report signal is reported from the external instrument.

2. The reproduced data output apparatus according to claim 1, wherein
the event occurrence identifier section is configured to identify the occurrence of the event by detecting an insertion or a removal of a cable performing a wired communication between the reproduced data output apparatus and the external instrument.

3. The reproduced data output apparatus according to claim 1, wherein
the report determiner section is configured to determine whether the operation status report signal is reported from the external instrument, within a first period of time that elapses from a time when the occurrence of the event is identified by the event occurrence identifier section.

4. The reproduced data output apparatus according to claim 1, wherein
the command transmission controller section is configured to transmit the command to the external instrument, after a second period of time elapses from a time when the report determiner section determines that the operation status report signal is reported from the external instrument.

5. The reproduced data output apparatus according to claim 1, wherein
the operation status identifier section is configured to identify, as the status of the present operation of the external instrument, one of statuses of a status of reproducing a content, a status of rewinding, a status of fast forwarding, a status of pausing, and a status of stopping; and
the command transmission controller section is configured to transmit the command that requires the re-start of one of reproducing a content, rewinding, fast forwarding, pausing, and stopping, to the external instrument.

6. The reproduced data output apparatus according to claim 1, wherein
the reproduced data receiver section is configured to receive, as the reproduced data, a music data of a music content from the external instrument having the reproduction function of the music content.

7. The reproduced data output apparatus according to claim 1, wherein
the reproduced data receiver section is configured to receive, as the reproduced data, an image data of an image content from the external instrument having the reproduction function of the image content.

8. The reproduced data output apparatus according to claim 1, wherein:
the reproduced data receiver section is configured to receive the reproduced data from the external instrument via a wireless communication; and
the command transmission controller section is configured to transmit the command to the external instrument via a wireless communication.

9. A computer-readable non-transitory storage medium storing a computer program product, the computer program product causing a controller unit of a reproduced data output apparatus connected to an external instrument having a reproduction function of a content to execute the steps of: a first step of identifying a status of a present operation of the external instrument; a second step of identifying an occurrence of an event; a third step of determining whether an operation status report signal indicating that a status of a present operation of the external instrument is a status of a different operation is reported from the external instrument, in response to that the second step identifies an occurrence of an event during a status of a first operation being identified by the first step as a status of a present operation of the external instrument; and a fourth step of transmitting a command that requires a re-start of the first operation to the external instrument, in response to that the third step determines that the operation status report signal is reported from the external instrument.

10. A reproduced data output apparatus, comprising:
a vehicular reproduced data receiver section configured to receive a reproduced data of a content from a portable information terminal having a reproduction function of the content;
a reproduction status identifier section configured to identify a status of a present reproduction of the content of the portable information terminal;
an event occurrence identifier section configured to identify an occurrence of an event relating to data communication;
a report determiner section configured to determine whether a reproduction status report signal indicating that a status of a present reproduction of the portable information terminal is a status of a different reproduction is reported from the portable information terminal, in response to that the event occurrence identifier section identifies an occurrence of an event during a status of a first reproduction being identified by the reproduction status identifier section as a status of a present reproduction of the portable information terminal; and
a command transmission controller section configured to transmit a command that requires a re-start of the first reproduction to the portable information terminal, in response to that the report determiner section determines that the reproduction status report signal is reported from the portable information terminal.

* * * * *